United States Patent Office.

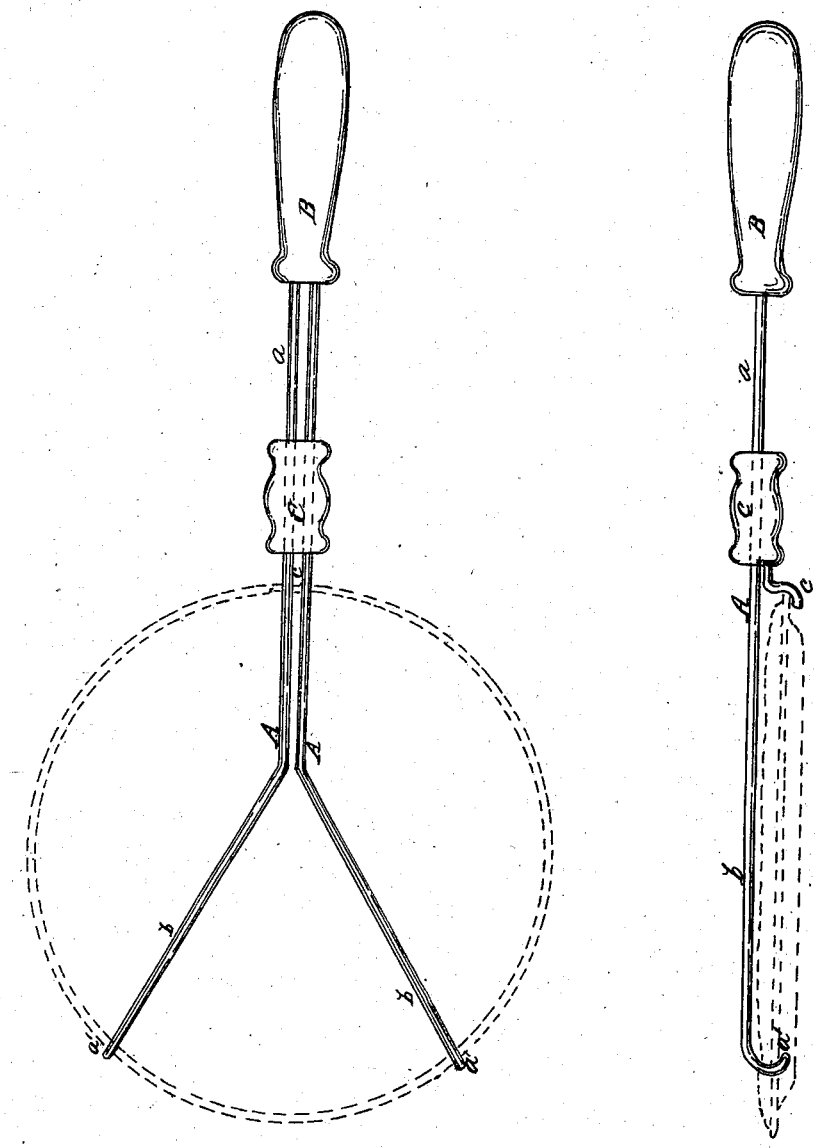

GEORGE O. ROE, OF CONANTSVILLE, CONNECTICUT.

Letters Patent No. 74,598, dated February 18, 1868; antedated February 6, 1868.

IMPROVED PLATE-LIFTER.

*The Schedule referred to in these Letters Patent and making part of the same.*

TO ALL WHOM IT MAY CONCERN:

Be it known that I, GEORGE O. ROE, of Conantsville, in the county of Tolland, and State of Connecticut, have invented a new and useful Improvement in Lifters for Lifting Plates; and I do hereby declare that the following is a full, clear, and exact description of the same, reference being had to the accompanying drawings, making a portion of this specification, in which—

Figure 1 is a plan view of a device constructed according to my invention.

Figure 2 is a side view of the same.

Similar letters of reference indicate corresponding parts in both figures.

The object of this invention is to provide an efficient means whereby plates containing pies, or other like articles, may be conveniently lifted and carried when in a heated condition, without danger of burning the hands of the person thus lifting the said plates.

The invention consists in two hooked arms provided upon a suitable shank, and so combined with a sliding hook that, by moving the said sliding hook upon the shank, the plate may be grasped between the same and the hooks of the arms aforesaid, thereby effectually securing the desired result.

To enable others to understand the nature and construction of my invention, I will proceed to describe it with reference to the drawings.

A represents two strong wires, which are fitted into a suitable handle, B, and the inner portions $a$ of which constitute the shank of the device, the outer portion $b$ of each wire being bent laterally at an angle to the shank, as represented in fig. 1, and forming an arm, the extremity of which is bent down into the form of a hook, as shown at $a'$. C indicates a slide, provided with two longitudinal slots, through which the shank $a$ is passed. Extending downward from the forward end of this slide is a hook, $c$, the shape and position of which are shown more clearly in fig. 2.

In using the device, the arms $b$ are extended over the plate to be lifted, and the hooks $a'$ are made to catch under the edge of the plate at one side thereof, whereupon the slide C is moved forward to bring the hook $c$ under the edge at the side of the plate opposite the hooks $a'$, in such manner that the plate, being thus caught at its edges by the three hooks, may then be lifted and carried from place to place with very great convenience, and without danger or liability of burning the hands of the person handling the plates. The hold of the device upon the plate is rendered very secure from the fact that the elasticity of the arms $b$ permits them to spring laterally when the sliding hook $c$ is brought up to its place, so that the friction exerted by the shank $a$ upon the slide, through which it passes, prevents the said slide from slipping back, the hooks being by this means kept constantly pressed to their places.

Furthermore, inasmuch as the sliding hook $c$ may be moved to any desired point upon the shank, the device may be employed for lifting plates varying very much in size.

What I claim as my invention, and desire to secure by Letters Patent, is—

The lifter, composed of the hooked arms $b$, shank $a$, and sliding hook $c$, the whole arranged and operating substantially as and for the purpose specified.

GEORGE O. ROE.

Witnesses:
J. W. COOMBS,
G. W. REED.